United States Patent

Gregory

[15] 3,665,761

[45] May 30, 1972

[54] LIQUID VAPORIZATION CALORIMETER

[72] Inventor: William D. Gregory, Vienna, Va.

[73] Assignee: Georgetown University, Washington, D.C.

[22] Filed: June 8, 1967

[21] Appl. No.: 644,703

[52] U.S. Cl. .......................................................73/190
[51] Int. Cl. ................................................G01n 1/00
[58] Field of Search ...........................................73/190, 193

[56] References Cited

OTHER PUBLICATIONS

Cannon C. V. and Jenkins G. H., A Microcalorimeter Suitable for Study of Easily Absorbed Nuclear Radiations, 21 Review of Sci. Instruments, 236 (March, 1950)

Primary Examiner—James J. Gill
Assistant Examiner—John K. Lunsford
Attorney—Shlesinger, Arkwright & Garvey

[57] ABSTRACT

A calorimeter assembly comprising Dewar flask means, a sealed vacuum container positioned in the bottom of the Dewar flask means and a sealed sample holding container positioned in the vacuum container provided with sump means and a gas removal tube connected to the sump means; the gas removal tube extending toward the top of the Dewar flask means and having a portion located outside of the vacuum container which portion includes spiral windings, and means for introducing fluids into the Dewar flask means and said sample container and means for regulating pressure in the Dewar flask means and for measuring gas flow from the sample container. The invention also includes the method of measuring heat loss by use of the calorimeter assembly set out in which the volume of gas emitted from the gas removal tube is compared with that volume of gas emitted for a known heat input.

17 Claims, 2 Drawing Figures

INVENTOR
William D. Gregory

BY Shlesinger, Arkwright & Garvey
ATTORNEYS

LIQUID VAPORIZATION CALORIMETER

This invention relates to instruments used in the measurement of heat and more specifically to liquid vaporization calorimeters.

HISTORY AND DEVELOPMENT

There are two ways to increase the accuracy of any calorimeter system. First by increasing its sensitivity to a given input of heat. Second, by obtaining knowledge of the heat leak levels accurately or in the alternative by eliminating heat leak entirely or reducing it to an acceptable standard level.

A helium vaporization calorimeter has high sensitivity because of the low value of the heat of vaporization of liquid helium. It is well know that at the boiling point of a liquid, heat introduced does not raise the temperature of the liquid but instead acts only to change some of the liquid atoms to vapor. The rate at which liquid is converted into a gas, $dm/dt$ is given by $dm/dt = Q$, where = latent heat of vaporization per unit mass, and $Q$ is the heat power. For liquid helium, the latent heat is about 5 calories per gram of liquid at the boiling point (4.2°K), one of the lowest latent heats of any known liquid. Using this value for the latent heat, we find that 1 milliwatt of heating will boil away 1.5cc of liquid per hour which is equivalent to 1 liter of gas at standard temperature and pressure per hour.

If one utilizes a simple system to measure the total gas evolved, very low heat outputs can be detected. Such a system may consist of a graduated cylinder inverted in a container of water in which the evolved gas is admitted to the cylinder and is allowed to displace the liquid. The amount of liquid displaced measures the total volume of gas collected. It can be shown, in fact, that a heat input as low as $10^{-9}$ watts will produce a readily measurable change of height in the liquid level in a period of one hour. Another alternative is to simply re-collect and weigh the evolved liquid.

Heat may leak into any calorimeter in three ways: (1) by conduction; (2) by convection; and (3) by radiation. Design of previous calorimeters has aided in the reduction of heat leak from the first two sources namely by conduction and by convection. For example, the calorimeter can be placed in a vacuum and all connections with the "outside world" can be made of low thermal conductivity material (such as this calorimeter). To eliminate radiation heating, it is still necessary to regulate the temperature difference between the calorimeter and its adjacent surroundings. To illustrate this, we note that all bodies radiate heat according to their absolute temperature (degrees K) in a fashion well approximated for these purposes by the black-body radiation law where $$dP/dA = \sigma T^4 \quad (1)$$

$C$ = power in watts
$A$ = area in square meters
$\sigma = 5.67 \times 10^{-8} \, Wm^{-2}\,°K^{-4}$ According to this law, a body at 300°K (room temperature) is radiating 460 watts for every square meter of its surface area. However, the flow of heat predicted by equation (1) will not change the temperature of the body if the body is at exactly the same temperature at its surroundings, since the surroundings will also radiate at 460 watts/m² and replace all the heat lost by the body per unit time. If, however, the body (calorimeter) and its surroundings are at two different temperatures $T_1$ and $T_2$, there will be a net heat flow between the body and its surroundings given approximately by $$dP^1/dA = \sigma \, (T_1{}^4 \, 31 \, T_2{}^4) \quad (2)$$

If $T_1$ does not differ greatly from $T_2$, so that $T_1 = T_2 + \epsilon$ where $\epsilon << T_1$ or $T_2$ then equation (2) becomes $$dP^1/dA \approx \sigma T^{-4} (4\epsilon)/T \quad (3)$$

This equation then represents the stray heat flux due to radiation heating in any calorimeter. We note that this heat flux is proportional to the fourth power of the average temperature of the body (i.e., the calorimeter) and the surroundings. Hence, to keep the heat flux at a minimum for any given temperature difference between the calorimeter and surroundings ($\epsilon$ in equation (3)) it is desirable to get to as low a temperature as possible. In particular, if a temperature of 4.2°K is used, the factor $\sigma T^4$ is equal to $1.4 \times 10^{-5}$ watts/m² in comparison to 460 watts/m² at 300°K. This means, then, that the temperature control factor, $\epsilon$, between the calorimeter and surroundings necessary to maintain any given heat leak may be larger by a factor of $460/(1.4 \times 10^{-5}) = 3 \times 10^7$ at cryogenic temperatures versus room temperature. Because of this large increase in the minimum allowable temperature deviation, the liquid helium calorimeter is quite advantageous for reducing heat leaks due to radiation. Because the thermal conductivity of most materials is rather low at 4.2°K, the portion of heat leaking into the calorimeter by conduction is also kept to a minimum. Finally, because the measurement takes place at a constant temperature due to the removal of heat by the vaporization process, it is easier to maintain the temperature control between the surroundings and the calorimeter necessary to minimize these heat leaks.

OBJECTS AND SUMMARY

It is therefore an object of this invention to provide a calorimeter which can be used for the measurement of the average energy loss and the activity involved in radioactive decay.

Another object of this invention is to provide a calorimeter which can measure the heat evolved from electromagnetic radiation and in particular for infrared radiation.

Still a further object of this invention is to provide a calorimeter which will measure the heat evolved in chemical reactions accurately. For example, in radioactive decay the absolute activity in curies of a radioactive specimen is related to the heat evolved and the average energy lost in the decay by the relation.

$$H \text{ (watts)} = 5.94 \times 10^{-3} \, A \text{ (curies)} \, E \text{ (MeV)}.$$

For a measurement of heat on the order of $10^{-9}$ watts, accurate to 1 percent (obtainable with the calorimeter of this invention) it would then be possible to measure the absolute activity of a radioactive specimen having a 1 MeV average decay energy with an activity as low as 0.2 microcuries, or the activity of a 0.02 microcurie specimen having 10 MeV average decay in energy, to 1 percent. It is therefore an object of this invention to provide a calorimeter which allows for the determination of an absolute versus a relative measurement of activity of a radioactive specimen with a sensitivity previously possible only with relative measurements of the activity made electronically.

Yet another object of this invention is to provide a calorimeter system which combines high sensitivity with high accuracy for measurement of nuclear activities and thus provide a calorimeter system and apparatus which can be utilized in medical facilities utilizing radioactive specimens; in research laboratories, investigation of properties of matter with radiation; in industrial concerns using radioactivity to make measurements such as density measurements; in the fuel cell and energy conversion industry, particularly those aspects concerned with converting radioactive energy into electrical energy; for the analysis of fuels for atomic reactors; and for calibrating standards for checking the accuracy of dosimeters used to determine the amount of radiation reaching any personnel handling radioactive materials.

A further object of this invention is to provide a calorimeter system and assembly for the purpose of detecting electromagnetic radiation such as for example infrared radiation in long response time communications.

Another object of this invention is to provide a calorimeter system and apparatus which can be used in the field of satellite and space communications which utilize infrared radiation.

Still another object of this invention is to provide a calorimeter which has a low heat leak and a high sensitivity and in which measurements may be made isothermally at any fixed temperature from 4.2°K to hundreds of degrees Kelvin by the choice of an appropriate liquid.

It is a further object of the invention to provide a calorimeter which allows for ease in temperature control between the surroundings and the calorimeter so as to thereby minimize heat leaks.

In summary, this invention relates to the apparatus and method of increasing the accuracy of calorimeters by reducing heat loss through the use of a gas removal tube connected to the yield sample holder and the vacuum can used within the Dewar flasks and by detailed construction of the gas removal tube including a sump and fins and coiled arrangement.

These and other objects and features of this invention will be better understood from the more detailed description taken in conjunction with the drawings in which.

Figure 1:
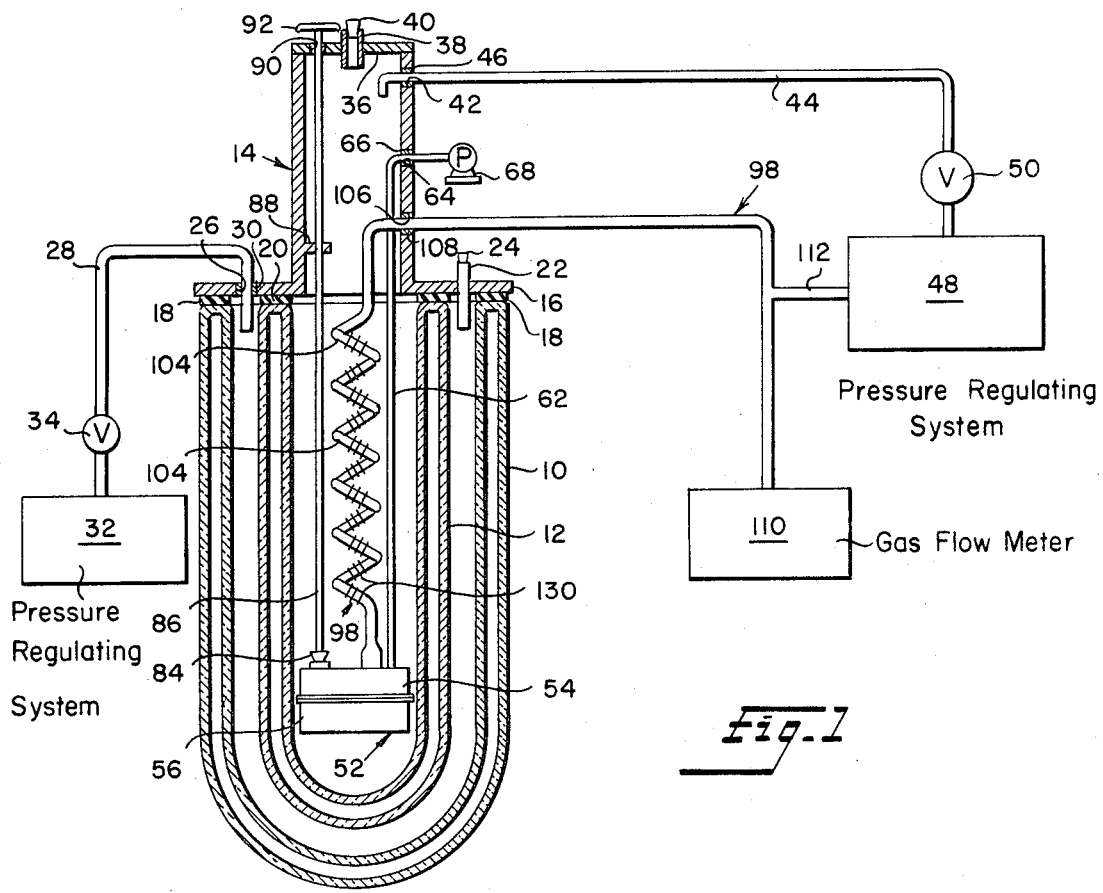
FIG. 1 is a cross sectional view partially in diagram showing the calorimeter assembly and system.

Referring now to FIG. 1, the calorimeter system includes an outer Dewar flask 10 of a conventional type. An inner Dewar flask 12 is positioned within the flask 10 and spaced from the walls thereof as illustrated in FIG. 1. The Dewar flasks 10 and 12 are of the conventional type made of a double walled glass with a vacuum between the walls and coated chemically with a highly reflective surface of silver or the like. The purpose of the Dewars is to act as a shield and heat sink. The Dewars are spaced from each other by means (not shown) and are supported on a platform or the like by supporting means (not shown). Most Dewars are cylindrical in cross section though the cross sectional configuration is generally not critical. A cover member 14 is provided for covering and shielding the Dewars 10 and 12. The cover 14 has an annular flange member 16 for mounting gaskets 18 and 20 for sealing the Dewars from each other. The flange 16 has a tubular member 22 which is provided with a plug 24. The tubular member allows for introduction of a fluid between the Dewars 10 and 12 as will be explained hereinafter. The flange 16 is also provided with an opening 26 for a tube 28. A seal 30 is provided in the opening 26 for the tube 28. The tube 28 leads to a pressure regulator and system 32. A valve 34 is provided in the tube 28 leading to the pressure regulator system 32.

The cover member 14 is provided with an upper housing 36. The housing 36 is provided with a tubular member 38 having a plug 40. The tubular member allows for introduction of fluid into the upper housing 36 and thence into the inner Dewar flask 12. An opening 42 is provided in the wall of the upper hosing 36 for receipt of a tube 44. A gasket 46 seals the tube 44 in the opening 42.

The tube 44 leads to a pressure regulator and system 48 generally similar to the pressure regulator and system 32. A valve 50 is provided in the tube 44 for controlling the flow in a manner similar to valve 34.

Figure 2:
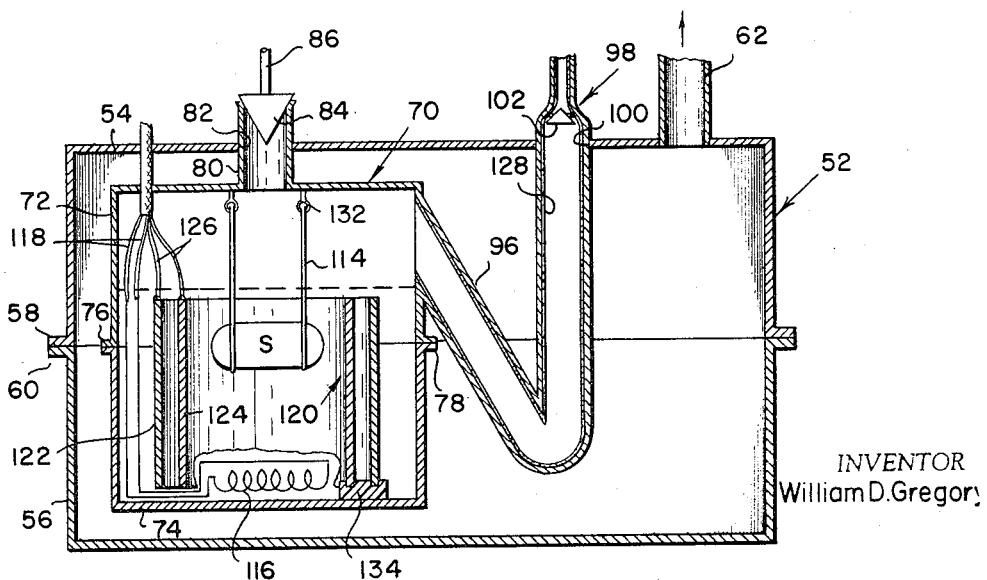
FIG. 2 is an enlarged cross sectional view in fragment showing the vacuum can, and the sample holder mounted therein and various sealing and valving features.

Within the Dewar 12 and in the bottom thereof is a vacuum can generally indicated at 52. The vacuum can comprises an upper member 54 and a lower member 56. The upper and lower members are provided with flanges 58 and 60 which are clamped, crimped or otherwise secured together in a sealed fashion as best illustrated in FIG. 2. The upper member 54 of the can 52 is provided with a vacuum line 62 which extends upwardly and out of the Dewar flask 12 and through an opening 64 in the upper housing 36. The vacuum line 62 is sealed by a gasket 66 in the opening 64. The vacuum line 62 leads to a vacuum pump 68 which draws a vacuum on the vacuum can 52. The vacuum can 52 may be supported within the Dewar 12 by the vacuum line 62 or by any other means (not shown).

Within the vacuum can 52 is a sample container 70 having an upper member 72 and a lower member 74. The sample container 70 is provided with flanges 76 and 78 so as to provide a seal between the two parts which are clamped or otherwise secured together in a manner similar to the flanges 58 and 60 of the vacuum can 52. The sample container 70 is provided with a tubular nipple 80 which projects upwardly through an opening 82 in the vacuum can 52. A needle valve 84 closes the nipple 80. The valve 84 is controlled by a rod 86 which extends upwardly in the Dewar 12 and through a support bracket 88 mounted in the cover member 14. The rod 86 projects through an opening 90 in the upper housing 36 of the cover member 14. The rod terminates in a handle 92. A seal 94 is provided between the rod 86 and the opening 90. The nipple 80 may be soldered or otherwise secured and sealed to the vacuum can 52. The seal (not shown) is formed about the opening 82.

Projecting downwardly from the upper member of the sample container is a sump or trap 96. The trap 96 is connected to a gas tube 98 and may be integral therewith. The gas tube 98 is mounted in an opening 100 in the vacuum container 52. It is sealed in the opening by solder or other means (not shown).

The gas tube 98 which includes the trap 96 is provided with a gas deflector or baffle 102. The tube 98 includes a series of helices 104 as shown in FIG. 1. The helices 104 extend upwardly at least to the top of the Dewar 12. The gas tube 98 passes through an opening 106 in the wall of the upper housing 36 of the cover 14. Sealing means 108 is provided in the opening 106 for sealing the tube 98. In all instances where there are seals required, the seals may be of gasketing material or may comprise a weld or solder seal. The tube 98 is connected to a gas flow meter 110 generally indicated in FIG. 1. A balancing system may be set up between the tube 98 and the pressure regulator system 48 as by means of a tube 112.

Within the sample container 70, means such as nylon thread 114 is used to support the sample S. It will be obvious that various means may be used for introducing and supporting the sample within the sample container 70. For example, openings may be provided through the Dewars and the various containers for introducing a light rod, or the like. Various valve trap systems or the like may also be used for introducing the sample.

In the bottom of the sample container, is positioned an electrical heater 116 as generally indicated by the coil shown in FIG. 2. The electrical leads 118 for the heater 116 can be arranged to extend from the sample container 70 to an outside electrical source by providing openings in the walls of the various containers etc.

Within the sample container 70 is also located a volume level indicator 120 which may consist of two cylindrical metal tubes which are electrically connected by electrical leads 126 to an outside indicator in a manner similar to electrical leads 118 heretofore described.

One important aspect of this invention is the provision of an absorptive black coating 128 on the inside of the gas tube 98.

HEAT SHIELD AND HEAT SINK SYSTEMS

If helium is used as the vaporization liquid, the outer Dewar 10 contains liquid nitrogen and the inner Dewar 12 contains liquid helium. If other liquids are used for vaporization, the inner Dewar 12 contains the vaporization liquid while the outer Dewar 10 may contain this liquid or any other suitable liquid. All such liquid should be maintain at their boiling points with appropriate heaters in the Dewars if necessary. More than two Dewars may be utilized. Any radiation or conduction heating not rejected by the Dewars should be removed by vaporization of the liquid in the two Dewars. For example, when helium is used for vaporization, the nitrogen shield maintains a temperature of 77°K about the helium Dewar and, thus, substantially reduces the radiation heat flux from the room temperature value of $\sigma(300°K)^4$ to $\sigma(77°K)^4$. In order to keep the heat leaks further minimized, the temperature of the liquid in the Dewars may be stabilized by stabilizing the vapor pressure through the pressure regulating systems 32 and 48.

The principle of using a cryogenic heat shield may be extended to the use of several nitrogen and helium shields for better control of heat leaks without seriously altering the intent of this invention. In the case when cryogenic fluids are not used as the vaporization liquid, a Dewar type heat shield is still preferred. In the case that glass would be too fragile as a material for the Dewar, Dewars are commercially available in stainless steel or other materials. Such Dewars may be more useful when large powerful heat sources such as atomic fuel rods etc. are investigated.

VACUUM CAN AND SAMPLE HOLDER

Both the inside of the vacuum can 52 and the inside of the sample holder or container 70 and all parts within the vacuum can 52 are coated with a highly reflective material such as silver. The purpose of this reflective coating is to reduce the amount of radiation heating due to an imbalance of temperature between the calorimeter sample holder and the vacuum can by reflecting a substantial portion of the heat flux. If chemically deposited silver is used, only 1 percent of the imbalance will be absorbed by the sample holder or surroundings. The vacuum space is evacuated to $10^{-5}$ mm of mercury or less. Since it is known from experience that this pressure reduces the thermal conductivity of any remaining gas in the vacuum to the point that heat losses are limited by other conduction losses and by radiation heating.

The sample container 70 may be of copper. Liquid from the inner Dewar flask 12 is admitted into the sample holder by the needle valve 84. The gas that is evolved by the heat from the sample is removed from the sample container 70 by means of the sump or trap 96 of the gas tube 98. The sump 96 is curved below the level of the liquid in the sample can so that if any gas recondenses after being evolved, it will not drip back into the sample holder can. Therefore, the drop in liquid level as measured by the volume level indicator 120 will still be an accurate measure of the total amount of gas evolved, even if there is some re-condensation. This affords a double check of the measure of heat obtained by observing the volume of gas evolved.

As previously discussed, other means for introducing heat to be measured into the sample can can be provided by connections to the outside of the Dewar flasks 10 and 12 or by the provision of appropriate windows or the like.

GAS REMOVAL TUBE

The gas removal tube 98 and in general the sump or trap 96 is of a very thin walled stainless steel or other low thermal conductivity material and is of a considerable length in order to reduce the amount of thermal conduction heating down the tube walls from room temperature. In addition, the tube is coiled in helices 104 and coated internally as at 128 so that radiation from 300°K room temperature environment will be absorbed and transferred through the walls of the tube to the liquid in the Dewar, rather than being transferred into the calorimeter sample can. To further enhance the transmission of this heat into the Dewars through the tubing walls, a number of fins 130 of a high thermal conductivity material (such as copper) are fixed to the outside of the tubing to increase the thermal contact between the tubing and the cooling liquid.

The gas deflector or baffle 102 insures that any gas molecules back-flowing down the gas removal tube must collide several times with the baffle and the tube walls in the vicinity of the baffle. This helps prevent back-flow of heat from the 300°K environment of conduction or convection through the evolved gas.

PRESSURE SENSORS AND REGULATORS

In general, the pressure regulators and systems 32 and 48 may comprise (1) an oil differential pressure manometer to measure the difference in pressure between the calorimeter sample can and the Dewar, and to a pressure sensing and regulating device to sense the pressure difference and maintain it at a fixed level, thereby regulating the temperature difference between the calorimeter and its surroundings.

The pressure regulating devices 32 and 48 convert the pressure difference into an electrical signal used to adjust the pressure difference by varying the volume, V, by, for example, a ballast tank (not shown) connected to the Dewars by a servomotor and piston arrangement (not shown). An arrangement of this type regulates the pressure $P$ at constant temperature $T$, since by the ideal gas law, $P = NRT/V$. Quartz Bourdon tube pressure transducers are now commercially available which are applicable to this purpose. Pressure resolutions as small as 3 microns of mercury may be obtained with these devices corresponding to a temperature regulation of $2 \times 10^{-6}$°K at 4.2°K if helium is used for the vaporization liquid.

It will be obvious that many other pressure regulation systems can be used such as a vacuum chamber with a piece of rubber tubing passing through it in which the gas passing through the rubber tubing is maintained at the same pressure as the gas in the outside chamber since, if the pressure is too high inside the tube, the tube expands and reduces the pressure with a greater gas flow; conversely, a low pressure causes a construction of the tube and produces a rise in pressure by restricting the gas throughput. Such a device is known to regulate temperature to $10^{-4}$°K or better over a helium bath at 4.2°K.

GAS FLOW METER

The gas flow meter is used to count the volume of the gas evolved due to the sample heating. Many types of meters are available. One, e.g. graduated cylinder type, which is capable of $10^{-9}$ watt heat power resolution or better within 1 hour of observation when helium is used as the vaporization liquid would require a heat transfer unit to bring the evolved gas to standard conditions ($T = 0$°C, $P = 760$ mm of Hg) before measuring the volume flow rate. An alternative method of measuring the flow rate of the gas would be to use a commercial mass flow meter which is sensitive to the mass passing the sensor and not the volume of gas. If this type is used, it is not necessary (within broad limits of temperature and pressure) to bring the gas to standard temperature and pressure. The total mass flow can be converted directly to the total number of moles of gas directly.

This type of flow meter is sensitive to about 0.01 cc/min of gas flow, equivalent to $6 \times 10^{-7}$ watts if helium is used as the vaporization liquid.

VOLUME LEVEL INDICATOR

The volume level indicator registers the change of the level of the liquid as a change in the total capacitance between the two metal tubes 122 and 124. As the volume of liquid changes the total capacitance of the cylinders change linearly from one containing only liquid, with a dielectric constant of 0 to one containing only gaseous helium with a dielectric constant of about 1. This leads to an approximate linear change in the resonant frequency of an oscillator using this capacitor in a tank circuit. For a 1 Mc oscillator accurate to 1 cps it is then possible to observe changes in the liquid level of about 25 microns if helium is used as the vaporization liquid. Rings 132 are used for the nylon thread 114. Supports similar to 134 (FIG. 2) position indicator 120.

CALIBRATION SYSTEM

A typical calibration system for the calorimeter would be to pass a known current at a measured voltage to introduce a known amount of heat into the system. Since the voltage measured across the heater potentiometrically is compared directly to a Weston Cell calibrated by the National Bureau of Standards and since the current is measured by measuring the voltage drop through a National Bureau of Standards calibrated resistor, the electrical power calibration is then traceable to National Bureau of Standards heat standards.

An alternative form of a heat calibration is to use a radioactive source previously calibrated by the NBS.

When the unknown heat is being introduced into the sample container 70, gas will be evolved and the level of the liquid in the can 70 will drop. This drop in liquid level is monitored with the volume level indicator 120 and the gas evolved is monitored with the gas flow meter 110. At the same time, the pressure difference between the sample can 70 and the Dewar 12 is maintained at a difference equivalent to some desired temperature difference with the temperature of the outer Dewar bath 10 slightly higher than that of the sample can. This temperature difference helps prevent condensation of gas in a gas flow tube 98. Although the temperature difference will cause some heat leak, this difference will be maintained to a very high percision so that the heat leaks will be known quite accurately. For example, it the temperature difference is maintained within $10^{-6}$°K with a Bourdon tube pressure regulator when helium is used as the vaporization liquid, the heat will be known to within $10^{-11}$ watts, allowing a measurement of heats of $10^{-9}$ watts to 1 percent.

To check the value of the heat leaking into the system, the temperature difference between the sample can 70 and the Dewar flask 12 is held to a high degree of regulation for two different values. We have seen previously that heat leaks from all sources (radiation and conduction) are directly related to this temperature difference. Therefore, the volume flow of gas (or drop in liquid level), $V$, is given by $V_1 = V_x + V(\Delta T_1)$ stray heat
$V_2 = V_x + V(\Delta T_2)$ stray heat where $\Delta T_1$ and $\Delta T_2$ are the two temperature differences used. The above equation may be solved for $V_x$ and also for $V(\Delta T_1)$ and $V(\Delta T_2)$ to give the unknown heating and heat leaks, respectively. This process may be repeated several times to determine the uncertainty in the measurement of the unknown heating. When the gas flow and liquid level drop rates and the heat leaks are determined, the system is calibrated for a value of the heat of vaporization of the liquid used and the data are then converted into heat outputs.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

What I claim is:
1. A liquid vaporization calorimeter, comprising:
  a. a closed insulating container filled with a vaporizable liquid,
  b. a closed radiation trapping sample container disposed within the insulating container and which also contains the vaporizable liquid,
  c. a test sample supported in the sample container and immersed within the vaporizable liquid,
  d. the sample container having remotely operated valve means for admitting vaporizable liquid from the insulating container to the interior of the sample container,
  e. conduit means extending through the vaporizable liquid in the insulating container and connected at one end to the sample container for conducting vaporized liquid out of the sample container,
  f. the conduit means including means for reducing radiation heat leak,
  g. the sample container having liquid level measuring means disposed therein for accurately determining the height of the vaporizable liquid in the sample container, and
  h. a vacuum can surrounding said sample container and including means for maintaining a vacuum in the area between the can and the sample container.
2. A liquid vaporization calorimeter as set forth in claim 1, wherein:
  a. the vacuum can is evacuated to a pressure of $10^{-5}$ mm of mercury or less.
3. The liquid vaporization calorimeter of claim 1, wherein:
  a. gas volume measuring means is connected to the other end of the conduit for determining the amount of liquid vaporized by the heat given off by the test sample.
4. The liquid vaporization calorimeter as set forth in claim 3, wherein:
  a. the gas volume measuring means includes a gas flow meter.
5. The liquid vaporization calorimeter of claim 1, wherein:
  a. the conduit means includes a gas tube disposed in the space between the vacuum can and the sample container which is connected to the sample container above its vaporizable liquid level and includes a trap section which is disposed below the liquid level.
6. The liquid vaporization calorimeter of claim 1, wherein:
  a. the internal surface of the vacuum can and all surfaces disposed within the can are coated with a high reflective material.
7. The liquid vaporization calorimeter as set forth in claim 1, wherein:
  a. common pressure regulation means is connected to the conduit means and the closed insulating container for maintaining a pressure differential substantially less than 1 mm of mercury.
8. The liquid vaporization calorimeter as set forth in claim 1, wherein:
  a. the liquid level measuring means includes an electrically responsive measuring circuit.
9. The liquid vaporization calorimeter as set forth in claim 8, wherein:
  a. the liquid level measuring means includes a vertically extending transducer disposed in the vaporizable liquid.
10. The liquid vaporization calorimeter as set forth in claim 9, wherein:
  a. the vertically extending transducer includes two parallel spaced conductors immersed in the vaporizable liquid which form part of the electrically responsive circuit.
11. The liquid vaporization calorimeter of claim 1, wherein:
  a. calibrating means is disposed within the vaporization liquid in the sample container for imparting heat to the vaporization liquid for calibration purposes.
12. The liquid vaporization calorimeter of claim 1, wherein:
  a. the conduit means is a metal helically coiled tube which has an internal absorptive coating.
13. The liquid vaporization calorimeter of claim 12, wherein:
  a. the metal tube has a plurality of external high thermal conducting fins which extend into the vaporizable liquid of the insulating vessel.
14. The liquid vaporization calorimeter of claim 12, wherein:
  a. a baffle member is disposed within the tube.
15. The liquid vaporization calorimeter of claim 12, wherein:
  a. common pressure regulation means is connected to the conduit means and the closed insulating container for maintaining a pressure differential substantially less than one mm of mercury.
16. The liquid vaporization calorimeter of claim 1, wherein:
  a. the insulating container is a Dewar vessel, and
  b. the Dewar vessel is disposed within an outer Dewar vessel and the space therebetween is filled with an insulating liquid under pressure.
17. The liquid vaporization calorimeter of claim 1, wherein:
  a. the vaporizable liquid is liquid helium,
  b. a common pressure regulation means is connected to the conduit means and the closed insulating container for maintaining a pressure differential substantially less than 1 mm of mercury,
  c. the means for reducing radiation heat leak in the conduit means includes the use of a thin wall metal helically shaped tube as the conduit means, and
  d. the conduit means includes a liquid accumulating trap section at the lower end thereof within the vacuum can which is disposed at an elevation below the vaporizable liquid level in the sample container.

* * * * *